UNITED STATES PATENT OFFICE.

AUGUSTE H. AUBIN, OF NEW YORK, N. Y.

CHEWING-GUM AND THE ART OF MANUFACTURING THE SAME.

SPECIFICATION forming part of Letters Patent No. 280,115, dated June 26, 1883.

Application filed March 10, 1883. (Specimens.)

*To all whom it may concern:*

Be it known that I, AUGUSTE HONORÉ AUBIN, a citizen of the United States, residing at New York city, in the county of New York, State of New York, have invented a new and useful Chewing-Gum and Art of Manufacturing the same, of which the following is a specification.

The object of my invention is to produce a chewing-gum in which the mastic and saccharine substances shall be so thoroughly combined and amalgamated one with the other as to have the appearance of pulled candy, and when broken every fragment shall have a uniform proportion of the two substances.

The invention consists, first, in incorporating and amalgamating the mastic and saccharine substances or materials by pulling them together simultaneously; second, in a composition for chewing-gum consisting of a mastic and saccharine substance amalgamated together by the said process in proportions of about one (1) part of mastic to three (3) parts of saccharine matter.

The process of manufacturing is as follows: The sugar, molasses, or other suitable saccharine material is cooked in the usual well-known manner until it reaches a condition suitable for pulling, when it is transferred to the slab and then to the hook and pulled in the usual manner. It is during the operation of pulling that the mastic substance is incorporated. For this purpose any suitable resinous or wax-like material may be employed, as, for example, rosin, paraffine, spruce-gum, &c. The several substances are first prepared by bringing them to a state suitable for easy amalgamation with the saccharine material. Paraffine, for example, is reduced to a liquid form, in which state it can be most readily and effectively used in my process. The paraffine or other mastic material which is to be employed in a soluble state is placed in a suitable vessel convenient to the hook on which the candy is to be pulled, and arranged so as to discharge the fluid paraffine, which is thereupon incorporated with the candy by the pulling operation, which is continued until from twenty (20) to twenty-five (25) per cent. of the paraffine is amalgamated with the candy, these proportions being necessary to produce a chewing-gum as distinguished from candy in which a small quantity of gum is sometimes mixed to give it body. By the pulling operation the paraffine is thoroughly incorporated with the candy and an amalgamation of the saccharine and mastic substances is produced. In this way, as will be readily understood, a combination of chewing-gum confectionery can be produced which has the appearance of the ordinary pulled candy, inasmuch as the mastic substance is so thoroughly incorporated with the saccharine matter as not to be distinguishable from it, and the bulk of the candy is far in excess of that of the mastic substances alone.

As before stated, any resinous or wax-like mastic material may be employed if it is properly prepared for absorption by and amalgamation with the candy in the operation of pulling. So, too, the saccharine matter may be any kind suitable for that class of confectionery known as "pulled candy," as, for example, sugar, sirup, molasses, glucose, or grape-sugar, or a mixture of two or more of these ingredients. Furthermore, in the process of making the chewing-gum candy it can be flavored and colored to taste by the use of any of the flavoring and coloring substances now employed in the manufacture of candy.

I do not claim, broadly, a composition of candy and paraffine in any proportion, but only in such proportions as to form a chewing-gum.

I claim—

1. The process of manufacturing chewing-gum herein described, consisting in pulling a cooked saccharine substance, incorporating therewith while pulling a liquefied mastic substance, and amalgamating the two substances by the pulling operation.

2. A chewing-gum composed of an amalgamated composition of a boiled and pulled saccharine substance and a mastic substance in the proportions herein described.

3. A chewing-gum composed of boiled and pulled sugar and liquefied paraffine amalgamated together in the proportions of twenty-five (25) per cent. of paraffine and seventy-five (75) per cent. of sugar, as specified.

AUGUSTE HONORÉ AUBIN.

Witnesses:
JULIUS REHWOLDT,
J. DOUGLAS BROWN.